United States Patent
Baldensperger et al.

(10) Patent No.: US 12,306,288 B2
(45) Date of Patent: May 20, 2025

(54) RADIO SYSTEM WITH MULTIPLE ANTENNA ARRAYS AND ADAPTIVE WAVEFORMS

(71) Applicant: MBDA FRANCE, Le Plessis-Robinson (FR)

(72) Inventors: Pierre Baldensperger, Le Plessis-Robinson (FR); Francois Magne, Paris (FR)

(73) Assignee: MBDA FRANCE, Le Plessis-Robinson (FR)

( * ) Notice: Subject to any disclaimer, the term of this patent is extended or adjusted under 35 U.S.C. 154(b) by 352 days.

(21) Appl. No.: 17/759,612

(22) PCT Filed: Dec. 30, 2020

(86) PCT No.: PCT/FR2020/052640
§ 371 (c)(1),
(2) Date: Jul. 27, 2022

(87) PCT Pub. No.: WO2021/152226
PCT Pub. Date: May 8, 2021

(65) Prior Publication Data
US 2023/0061894 A1 Mar. 2, 2023

(30) Foreign Application Priority Data
Jan. 30, 2020 (FR) ..................................... 2000929

(51) Int. Cl.
*G01S 13/34* (2006.01)
*G01S 13/58* (2006.01)
(Continued)

(52) U.S. Cl.
CPC ............ *G01S 13/34* (2013.01); *G01S 13/583* (2013.01); *G01S 13/589* (2013.01); *G01S 13/90* (2013.01); *H01Q 1/286* (2013.01); *H01Q 21/065* (2013.01)

(58) Field of Classification Search
CPC ......... G01S 13/90; G01S 13/89; H01Q 1/286; H01Q 1/287; H01Q 21/065
(Continued)

(56) References Cited

U.S. PATENT DOCUMENTS 4,387,373 A * 6/1983 Longuemare, Jr. .......................... G01S 13/9092
342/149
4,675,677 A 6/1987 Von Maydell et al.
(Continued)

FOREIGN PATENT DOCUMENTS

FR 2879753 A1 6/2006
WO 2006067220 A2 6/2006

OTHER PUBLICATIONS

Zaugg EC et al. "Theory and Application of Motion Compensation for LFM-CW SAR" IEEE Transactions on Geoscience and Remote Sensing, IEEE Service Center, Piscataway, NJ, US, vol. 46, No. 10,) pp. 2990-2998(Oct. 1, 2008).
(Continued)

*Primary Examiner* — Vladimir Magloire
*Assistant Examiner* — Michael W Justice
(74) *Attorney, Agent, or Firm* — FISHERBROYLES, LLP; Roger L. Browdy; James E. Mrose

(57) ABSTRACT

The radio system (10) comprises a waveform generator (1) alternately generating an FMCW wave representing a linearly frequency-modulated continuous wave for radar imaging and a CW wave representing a wave kept at a given frequency for measuring a velocity vector, an amplification
(Continued)

chain (2), a set (4) of transmit antennas (41, 42, 43), a set (5) of receive antennas (51, 52, 531, 532), a set (7) of receivers (71-2, 731, 732), and a signal processor (9) implementing processing operations on FMCW signals received from the one or more lateral antennas (51, 52) of the set (5) of receive antennas (51, 52, 531, 532) and spectrally analysing CW signals received from the one or more lateral antennas (51, 52) and from the one or more ventral antennas (531, 532) of the set (5) of receive antennas (51, 52, 531, 532) so as to supply SAR images and components of the velocity vector of said airborne vehicle (20).

15 Claims, 7 Drawing Sheets

(51) Int. Cl.
*G01S 13/90* (2006.01)
*H01Q 1/28* (2006.01)
*H01Q 21/06* (2006.01)

(58) Field of Classification Search
USPC .................................. 342/128, 25, 156, 158
See application file for complete search history.

(56) References Cited

U.S. PATENT DOCUMENTS

| | | | | |
|---|---|---|---|---|
| 5,546,084 | A * | 8/1996 | Hindman | G01S 7/411 |
| | | | | 342/162 |
| 5,559,516 | A * | 9/1996 | Didomizio | G01S 13/9092 |
| | | | | 342/147 |
| 8,212,714 | B1 * | 7/2012 | Doerry | G01S 13/90 |
| | | | | 342/25 R |
| 8,747,321 | B2 * | 6/2014 | Sankar | A61B 8/461 |
| | | | | 600/443 |
| 8,994,584 | B2 * | 3/2015 | Ranney | G01S 13/9019 |
| | | | | 342/161 |
| 9,019,144 | B2 * | 4/2015 | Calabrese | G01S 13/9029 |
| | | | | 342/25 C |
| 9,417,323 | B2 * | 8/2016 | Carande | G01S 13/9023 |
| 9,746,551 | B2 * | 8/2017 | Scholten | G01S 7/003 |
| 9,793,607 | B2 * | 10/2017 | Mcgough | H01Q 13/16 |
| 9,846,229 | B1 * | 12/2017 | Doerry | G01S 13/9019 |
| 10,436,888 | B2 * | 10/2019 | Li | G01S 13/886 |
| 10,718,659 | B2 * | 7/2020 | Nohmi | G01S 7/06 |
| 10,775,498 | B2 * | 9/2020 | Vacanti | G01S 13/4472 |
| 10,989,589 | B2 * | 4/2021 | Nohmi | G01H 17/00 |
| 11,255,663 | B2 * | 2/2022 | Binder | G01B 15/00 |
| 2012/0319892 | A1 * | 12/2012 | Calabrese | G01S 13/9023 |
| | | | | 342/25 C |
| 2014/0009324 | A1 * | 1/2014 | Ranney | G01S 13/534 |
| | | | | 342/161 |
| 2014/0114191 | A1 * | 4/2014 | Sankar | A61B 8/4483 |
| | | | | 600/443 |
| 2014/0139366 | A1 * | 5/2014 | Moses | G01S 13/536 |
| | | | | 342/63 |
| 2015/0042510 | A1 * | 2/2015 | Carande | G01S 13/9023 |
| | | | | 342/25 C |
| 2015/0276925 | A1 * | 10/2015 | Scholten | G01S 15/02 |
| | | | | 702/150 |
| 2016/0149303 | A1 * | 5/2016 | Mcgough | H01Q 5/357 |
| | | | | 343/767 |
| 2017/0299427 | A1 * | 10/2017 | Nohmi | G01S 7/06 |
| 2017/0356992 | A1 * | 12/2017 | Scholten | G01S 7/003 |
| 2019/0154439 | A1 * | 5/2019 | Binder | G01S 15/08 |
| 2020/0326230 | A1 * | 10/2020 | Nohmi | G01H 9/00 |

OTHER PUBLICATIONS

Yan Jiaming et al. "Vital-SAR-Imaging With a Drone-Based Hybrid Radar System" IEEE Transactions on Microwave Theory and Techniques, Plenum, USA, vol. 66, No. 12, pp. 5852-5862 Dec. 1, 2018.

Chenming Zhou et al. "A compact positioning and velocity RF sensor for improved inertial navigation" Microwave Symposium Digest, 2009. MIT '09. IEEE MIT-S International, IEEE, Piscataway, NJ, USA, pp. 1421-1424 Jun. 7, 2009.

Scannapieco Antonio Fulvio et al. "Multi-purposes radar for remote sensing and navigation by mini and micro unmanned aerial vehicles" 2016 IEEE International Geoscience and Remote Sensing Symposium 'IGARSS), IEEE, pp. 7354-7357, Jul. 10, 2016.

* cited by examiner

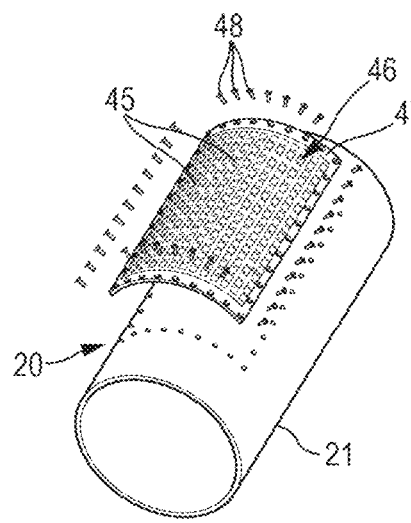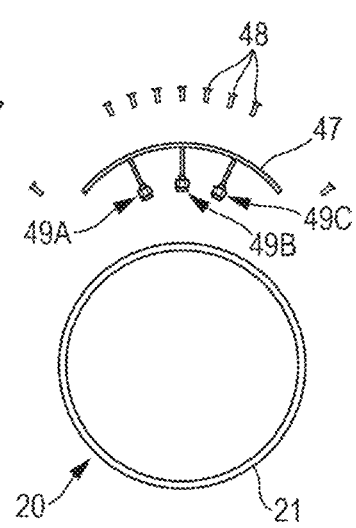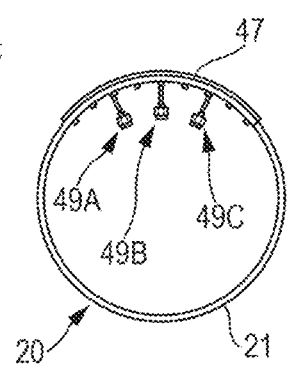
Fig. 8A   Fig. 8B   Fig. 8C
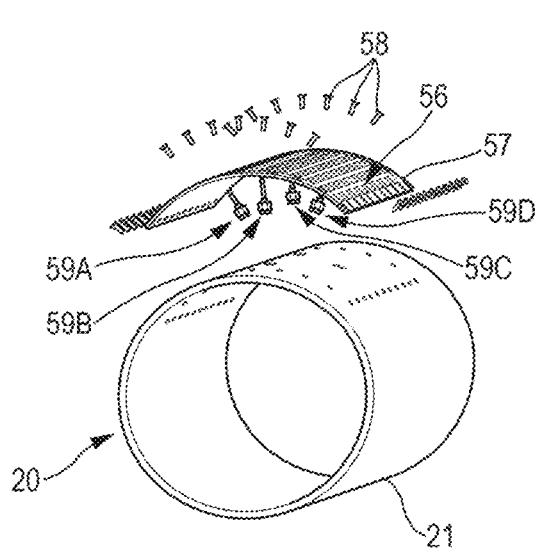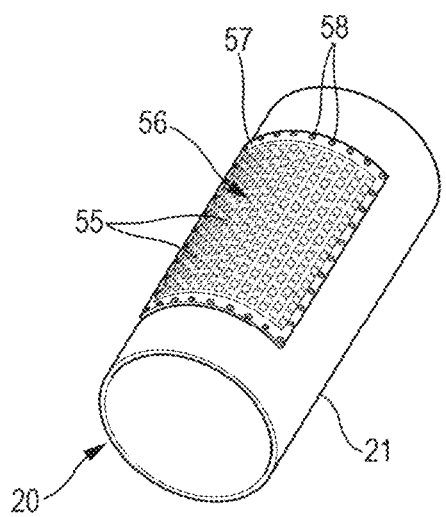
Fig. 9A   Fig. 9B

RADIO SYSTEM WITH MULTIPLE ANTENNA ARRAYS AND ADAPTIVE WAVEFORMS

TECHNICAL FIELD

The present invention relates to a radio system with multiple antenna arrays and adaptive waveforms, embarked on an airborne vehicle.

PRIOR ART

The vehicles (or objects) of reduced size intended to fly over long distances (several tens of kilometres or more) must be able to have an autonomous navigation. Indeed, the satellite navigation, of the GNSS type (Global Navigation Satellite System), can be jammed ("GNSS-denied") and at the same time the carrying of a sufficiently precise inertial unit (of a few meters) is incompatible for reasons of mass, overall dimension and cost.

The autonomous navigation, all weather and on any type of ground, therefore requires an independent system that cannot be optical or infrared due to the poor all-weather visibility at ranges of several kilometres.

A radio solution exploiting the reflectivity of the ground remains the only solution that can be precise, light and permanent enough.

The navigation by Synthetic Aperture Radar (SAR) seems to be suitable: the navigation readjustment is performed by locating the ground characteristics used as landmarks (roads, waterways, buildings, etc.). However, the landmarks may be rare, or even absent, over all or part of the flight path. This is in particular true over the sea, the desert or a large forest.

Moreover, on such small airborne vehicles, the velocity is not well known. However, the knowledge of the velocity is essential to the construction of the SAR image. Indeed, the adapted filtering realizing the azimuth resolution corresponds to a demodulation of a wave linearly modulated in frequency f in time t using the following formula F1: $f=-2V^2t/\lambda R$, well known to the person skilled in the art, in which V is the velocity modulus (i.e. the modulus of the velocity vector), $\lambda$ is the wavelength, and R is the observation distance.

Also, obtaining a resolution of a few meters requires a knowledge of the velocity of the order of 1%. The usual SAR radars, intended for terrain analysis, have a velocity module by the inertial unit of the carrier or by its satellite navigation (and often by a hybridization of the two means). When this velocity module is not accurate enough, the image is blurred. A focusing process can be implemented: several suitable filters are applied and the one with the best contrast on the image of the ground is selected. In this case, the initial inaccuracy is such that this process can be very cumbersome, but especially not operate if the contrast is too low (case of a uniform ground).

It follows that, in order to address the possible scarcity of the landmarks on the one hand, and the demand for velocity accuracy necessary for good imaging on the other hand, it is necessary to measure the velocity vector in conjunction with the SAR imaging.

While the theory and the development of a SAR radar are well known and described in the specialized literature, the measurement of the velocity vector is not commercially available.

The current situation is therefore not completely satisfactory.

DESCRIPTION OF THE INVENTION

The present invention relates to a radio system embarked on an airborne vehicle, which aims to remedy this disadvantage.

According to the invention, said radio system comprises at least the following elements:
- a waveform generator generating, alternately, an FMCW wave (Frequency Modulated Continuous Wave) representing a linearly frequency-modulated continuous wave for a radar imaging and a CW wave (Continuous Wave) representing a wave kept at a given frequency for measuring a velocity vector;
- an amplification chain switched towards a set of transmit antennas;
- the set of transmit antennas comprising at least one lateral antenna and one ventral antenna;
- a set of receive antennas comprising at least one lateral antenna and one ventral antenna;
- a set of receivers linked to the set of receive antennas; and
- a signal processor (or central processing unit) implementing processing operations on FMCW signals received from the one or more lateral antennas of the set of receive antennas and spectrally analysing CW signals received from the one or more lateral antennas and from the one or more ventral antennas of the set of receive antennas so as to supply SAR images and components of the velocity vector of said airborne vehicle.

Advantageously, said radio system is configured to realize, from remarkable points of the SAR images associated with a position prediction obtained from the velocity vector, a readjustment of the airborne vehicle with respect to the ground.

Said radio system is thus a radar type system, which is embarked on a flying object (or carrier), and which exploits the backscatter of the ground to extract the measurement of the velocity vector as well as an imaging of the ground. This system is intended in particular for the navigation of flying objects by allowing them to locate their position in relation to the ground in an autonomous way, i.e. by freeing themselves from the navigation by GNSS satellite or by inertial unit.

Advantageously:
- the set of transmit antennas comprises two lateral antennas oriented at approximately +/−30° with respect to the vertical to the airborne vehicle and the set of receive antennas comprises two lateral antennas oriented at approximately +/−30° with respect to the vertical to the airborne vehicle; and/or
- the set of receive antennas comprises a double ventral antenna, arranged vertically with respect to the airborne vehicle.

In a preferred embodiment, the set of transmit antennas and the set of receive antennas are patch antenna arrays that follow the shape of the airborne vehicle. Also, advantageously:
- the arrays of transmit and receive antennas are decoupled and are associated by switching with the FMCW waveforms for realizing the SAR imaging and with the CW waveform for measuring the Doppler effect along the axes of the antennas;
- the array of receive ventral antennas is split into two sub-arrays forming two lobes so as to construct ways $\Sigma$ and Δ whose processing operation provides the incidence of the airborne vehicle; and the patch arrays have a low secondary lobe level pattern so as to resist jamming in threat directions.

Furthermore, advantageously, said radio system is configured to operate in sequence according to the nature of the ground.

Furthermore, advantageously, said radio system is configured to operate in at least one portion of the SHF (Special High Frequency) microwave range, and preferably in the bands C, X and Ku.

Furthermore, in an advantageous way, the microwave transmit and receive modules are realized with monolithic components or monolithic microwave integrated circuits MMIC made of gallium arsenide (AsGa) or gallium nitride (GaN).

In addition, the processing operation algorithms of the signal processor are advantageously implemented on a programmable logic circuit of the FPGA type (Field-Programmable Gate Array).

Furthermore, advantageously, said radio system comprises:
- a clock generator configured to synchronize at least the waveforms, the digitization and the processing operation of the signals of the signal processor; and/or
- a microcontroller configured to realize at least some of the following functions: at least one configuration, at least one control and at least one supervision of elements of said system.

Therefore, the radio system, described above, is an embarked system, exploiting the backscatter of the ground, this one being measured in several directions thanks to arrays of antennas and by means of several waveforms allowing jointly to measure the velocity vector of the airborne vehicle as well as to build an image of the ground.

This radio system can, thanks to its arrays of antennas and its waveforms, provide right or left SAR images and the components of the velocity vector of the airborne vehicle from which the remarkable points of the imaging associated with the position prediction obtained from the velocity vector allow to readjust the airborne vehicle with respect to the ground.

This radio system thus provides a solution allowing the navigation readjustment in any weather, regardless of the nature of the ground.

BRIEF DESCRIPTION OF FIGURES

Other characteristics and advantages of the system according to the invention will become clearer upon reading the following description of an illustrative and non-limiting example of an embodiment attached to the following figures.

FIGS. 8A, 8B and 8C are different views allowing to illustrate an example of arrangement of transmit antennas on a carrier.

FIGS. 9A and 9B are different views allowing to illustrate an example of arrangement of receive antennas on a carrier/

DETAILED DESCRIPTION

The following description, given by way of illustration and not in any way limiting, concerns a radio system (hereinafter "system 10") embarked on an airborne vehicle (or object), for example of reduced size, hereinafter referred to as "carrier 20". Said system 10 may correspond to an autonomous radio navigation system or a velocity and imaging navigation radar (NAVSAR).

The principle of the system 10 is mainly based on the design of antenna arrays whose beams are adapted on the one hand to the coverage of the terrain to be imaged, and on the other hand to the measurement of the Doppler effect in various directions to extract the components of the velocity vector. The waveforms applied to the antenna beams are, on the one hand, an FMCW wave, i.e. a linearly frequency-modulated continuous wave (FMCW stands for "Frequency Modulated Continuous Wave), to form an image of the ground according to the known principle of a SAR radar (synthetic antenna radar) and, on the other hand, a CW wave, i.e. a continuous wave of constant amplitude and frequency, used to measure the Doppler effect of the relative velocity of the carrier 20 in the directions of the antenna beams. From this information, a specialist of the navigation is able to locate the position of the carrier in relation to the ground.

Figure 1:
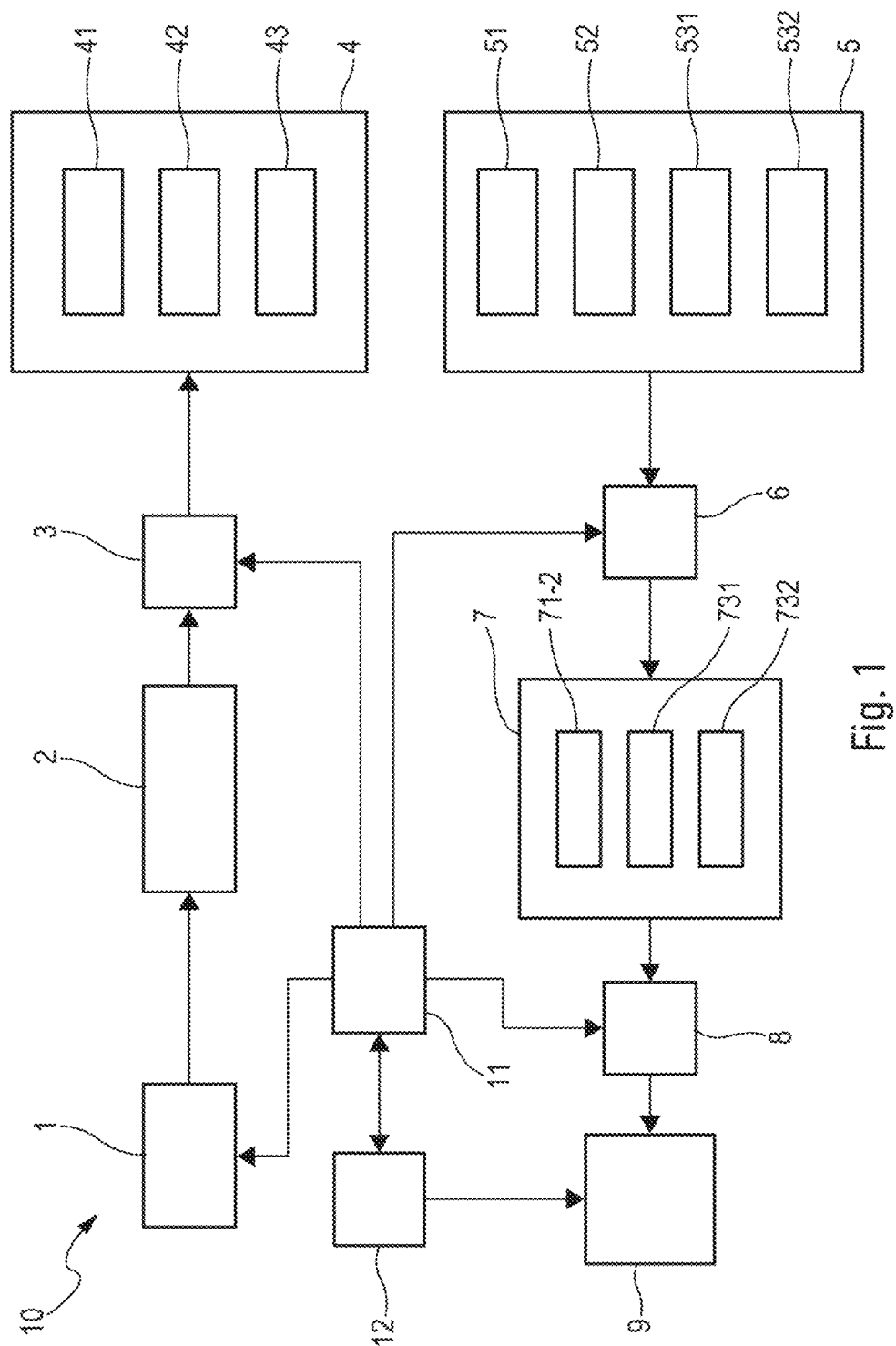
FIG. 1 is a block diagram of a particular embodiment of a radio system.

As shown in FIG. 1, the system 10 comprises a waveform generator 1 (or synthesizer), an amplification chain 2, a switch 3, a transmit antenna array 4, a receive antenna array 5, a switch 6, a set of receivers 7, a multiple analog-to-digital converter 8 (ADC), and a signal processor 9.

The waveform generator 1 (or synthesizer) provides, alternately, an FMCW wave and a CW wave at the desired frequency.

The choice of this frequency is to be made among the ranges C, X, Ku, according to the following data:
- of the table of the frequencies of the national regulator;
- of the available space on the carrier;
- of the range and the accuracy on the velocity vector as requested;
- the desired resolution of the image; and
- of the employment area (rain).

As an illustration, we note that most airplane SAR radars operate in band X (around 9.3 GHz). However, if the carrier is small, it is better to increase the frequency to have smaller antennas with equal directivities, while taking into account the rain which may limit the range. Indeed, if the frequency is too high (e.g. band K to the 20 GHz), the range is reduced to a few kilometres in rainy weather. Also, the parameters of the spectrum of the power and of the size of the arrays 4 and 5 of antennas depend on the carrier and its mission.

The system 10 also comprises a clock generator 11 and a microcontroller 12.

Figure 2:
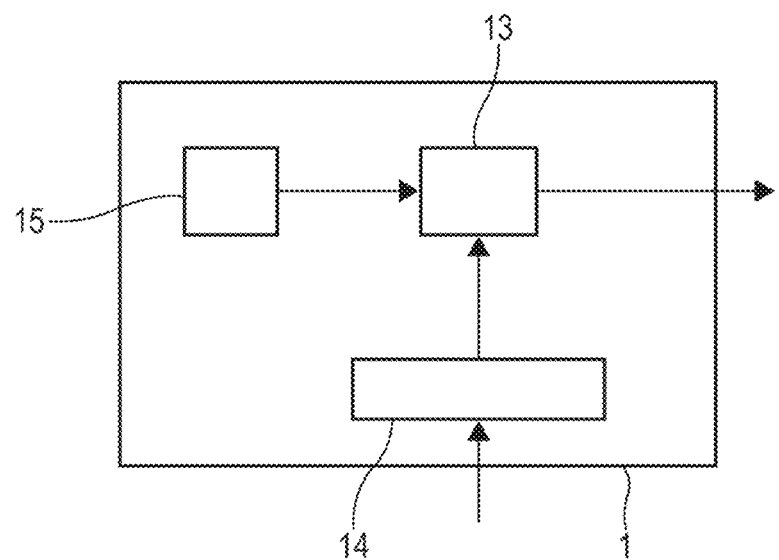
FIG. 2 is a block diagram of a waveform generator of the radio system.

As shown in FIG. 2, the waveform generator 1 (or synthesizer) comprises a central synthesis component 13

VCO-PLL (Voltage Control Oscillator-Phase Lock Loop) of which several exist on the market at the chosen frequencies. The waveform is controlled by a "sawtooth" voltage generator 14, which command the central synthesis component 13 in FMCW (sawtooth) or CW (direct voltage). The sawtooth voltage generator 14 is itself controlled by the clock generator 11 (preferably a commercial component) with respect to the sequencing, shown in FIG. 3, and by the microcontroller 12 with respect to parameters such as the frequency and the frequency deviation.

Figure 3:
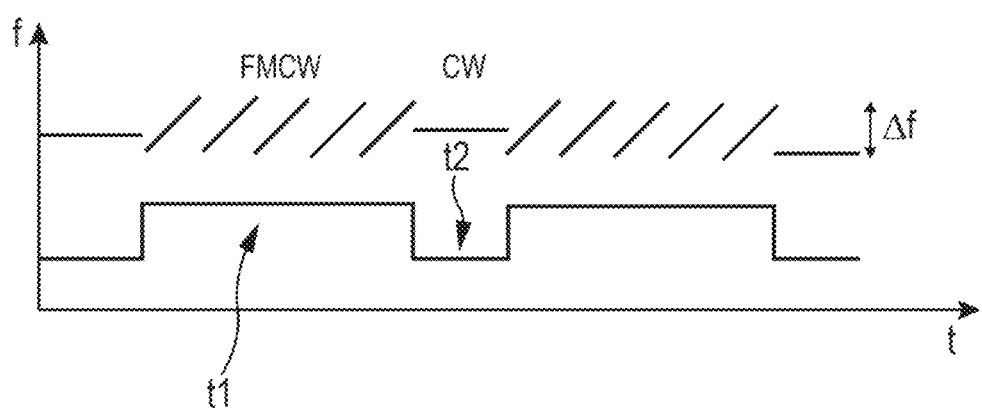
FIG. 3 is an example of waveform sequencing.

Note that the frequency deviation (Δf according to FIG. 3) determines the range resolution of the system 10 (SAR). The frequency stability of the set is ensured by a TCXO type crystal 15 (temperature-stable oscillator of which there are many examples on the market), shown in FIG. 2. In addition, as shown in FIG. 3, the time-frequency sequencing is performed alternately in CW and in FMCW. We give, as an example, typical values of this timing (t1 is for example between 10 and 20 seconds, and t2 is for example between 0.1 and 1 second) which is optimized according to the grounds overflown during the mission. Since navigation readjustment does not require permanent measurements of SAR (FMCW) and Doppler effect (CW) functions, the alternation saves a transmit and receive chain, as well as filtering to avoid interference. This allows to result in a compact and economical system 10.

The amplification chain 2 can comprise a commercial amplifier, whose power of a few watts depends on the desired range. It is followed by the switch 3 whose mission is to direct the CW signal on a ventral antenna 43 and the FM/CW signal on one of the two lateral antennas 41 and 42 specified below, of the set of transmit antennas 4.

The preferred embodiment with two lateral antennas 41 and 42 allows to search for the most significant terrain images relative to the ground track of the flight. This preferred embodiment is not mandatory, but it gives more possibilities to the system 10.

Figure 4:
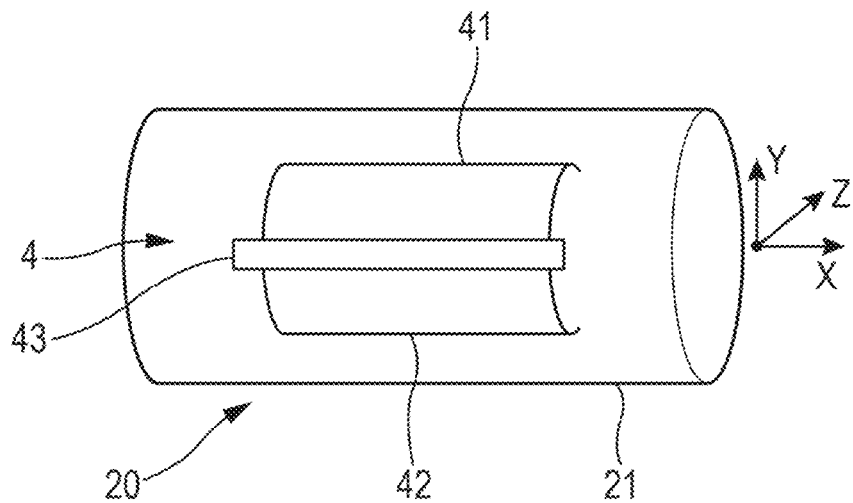
FIG. 4 illustrates an example of the arrangement of transmit antennas on a carrier.
Figure 5:
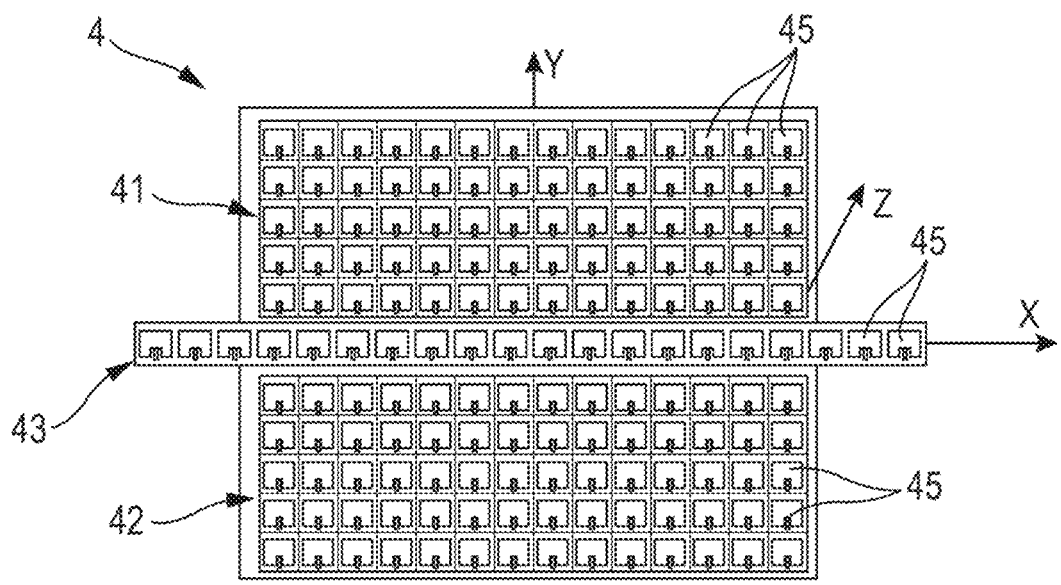
FIG. 5 shows an example embodiment of transmit antennas in the form of patch arrays.
Figure 10:
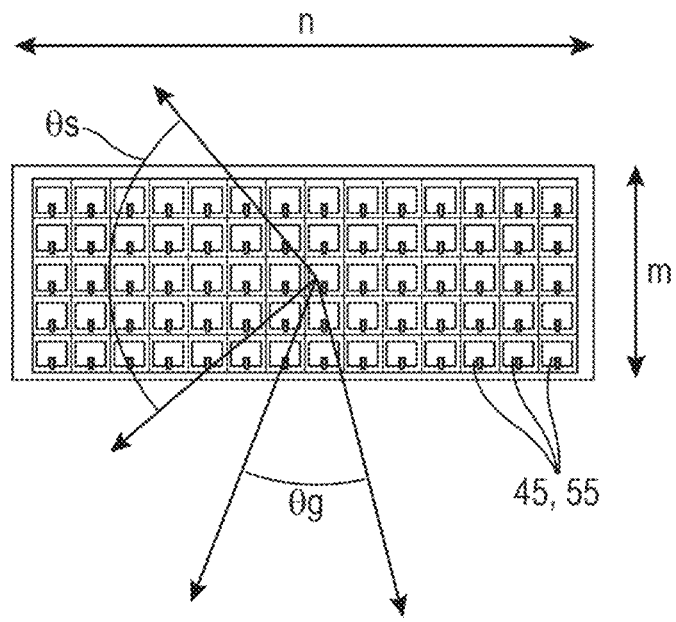
FIG. 10 shows elevation and bearing apertures of an array of n×m patches.

The set 4 of transmit antennas 41, 42 and 43 is shown in FIG. 4. The set 4 is implanted on the body 21 of the carrier 20. The ventral antenna 43 is oriented longitudinally in X and perpendicular to the axis −Z. X is the longitudinal axis of the carrier 21, Z is the vertical axis and Y is the transverse axis (orthogonal to the axes X and Z). On each side of the ventral antenna 43, the transmit antennas 41 and 42 are arranged on the left and on the right respectively. Each of the antennas 41, 42 and 43 is formed by an array of patches 45 as shown in FIG. 5. The requirements of the apertures or directivities are shown in FIG. 10 and in vertical cross-sections in FIGS. 11 and 12. According to FIG. 12, the lateral antenna patterns must cover the distance in Y specified by the mission on the ground.

Figure 11:
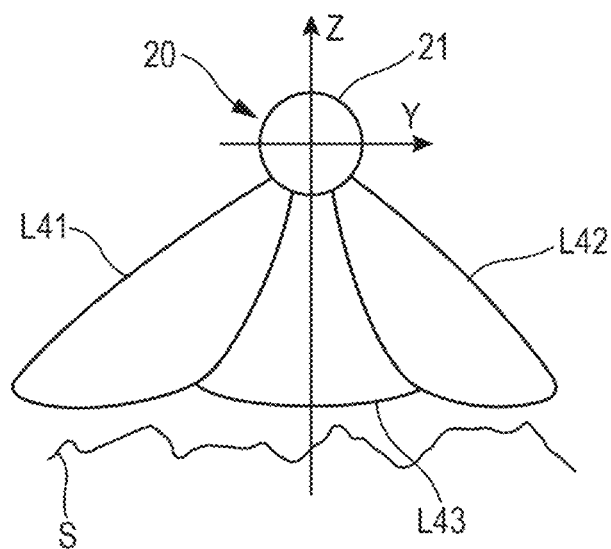
FIG. 11 is a front view of ventral antenna lobes.

In FIG. 11, the lobes L41, L42 and L43 of the transmit antennas 41, 42 and 43 are shown. The lobes of the receive antennas are hidden in this FIG. 11.

FIG. 10 shows elevation and bearing apertures of an array of n patches×m patches. FIG. 10 shows typical apertures for patches 45, 55 spaced apart of λ/2. As an example, knowing that one degree covers 17 m at 1000 m, the elevation aperture (θs in FIG. 10) to cover 1700 m at 5000 m requires an aperture of 20°. According to FIG. 10, it will take 90/20 or m=5 patches approximately. With respect to the bearing aperture (θg in FIG. 10) of all the arrays of antennas (aperture perpendicular to the axis X, FIG. 12), the directivity or the aperture should be as fine as possible, both for the radar budget and the accuracy of the Doppler measurements, as well as for secondary lobe control. In this regard, an advantage of the patch arrays is that the secondary lobes are controlled in phase by the distance between patches and the amplitude by the differentiated size of the patches. This property allows, in particular, to better protect the system 10 from possible jammers.

The number of patches is optimized according to the ability of the carrier 20 to receive them. In this respect, it should be noted that the increase in frequency allows for increased gain and directivity. However, there is a compromise with the attenuation of the rain that becomes significant beyond the band X (9-10 GHz). The parameters of the antennas will be optimized according to the carrier 20 and its mission, as the system 10 has a wide range of application. As an example of embodiment, the array of the set 4 of transmit antennas can be realized as a single printed circuit 46 brazed to a preformed metal plate 47, as shown in FIGS. 8A, 8B and 8C. This metal plate 47 is screwed on the body 21 of the carrier 20 (using screws 48), with the three connectors 49A, 49B and 49C (relating to the three arrays) passing through the body 21 of the carrier 20.

Figure 6:
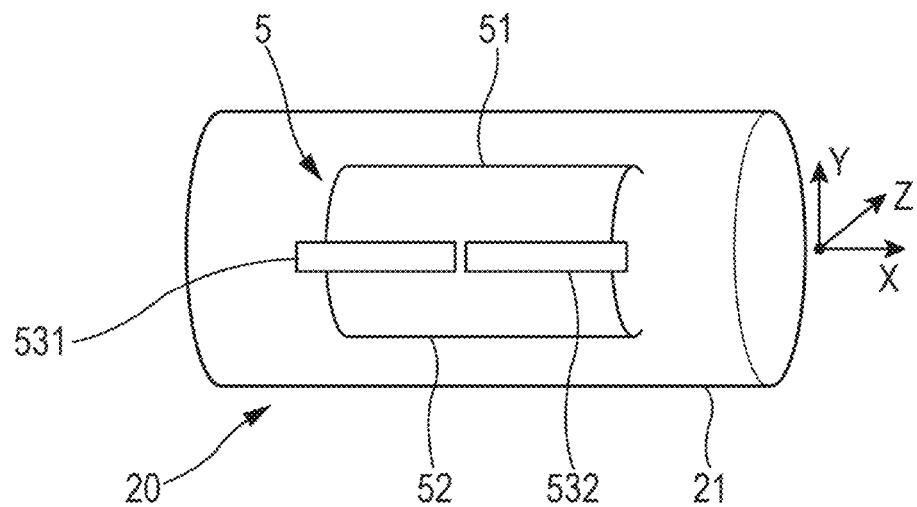
FIG. 6 shows an example of a receive antenna arrangement on a carrier.
Figure 7:
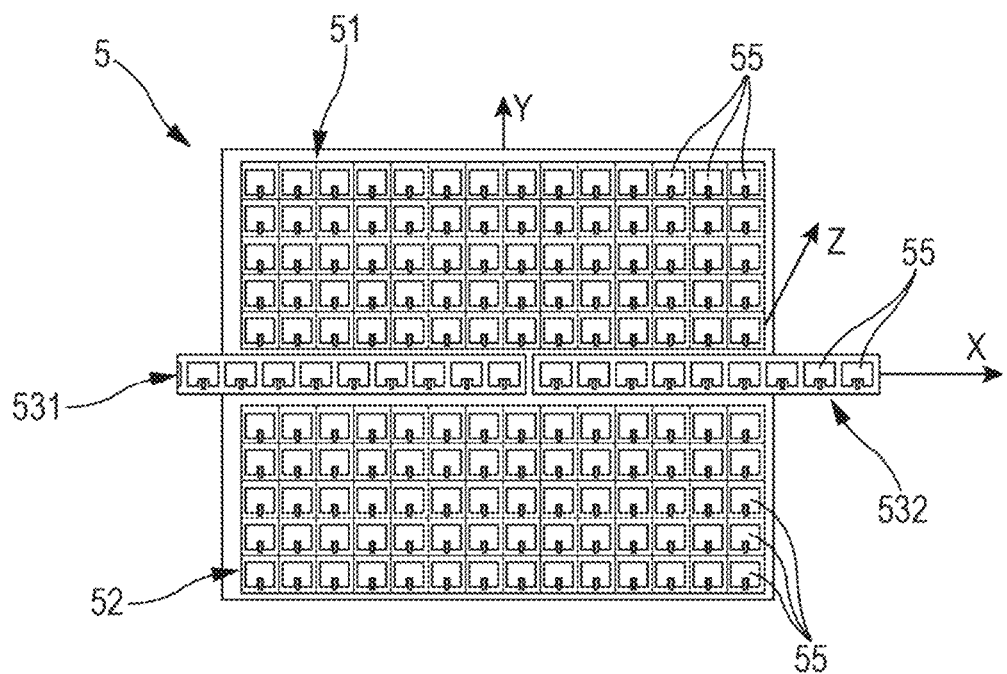
FIG. 7 shows an example of embodiment of receive antennas in the form of patch arrays.
Figure 12:
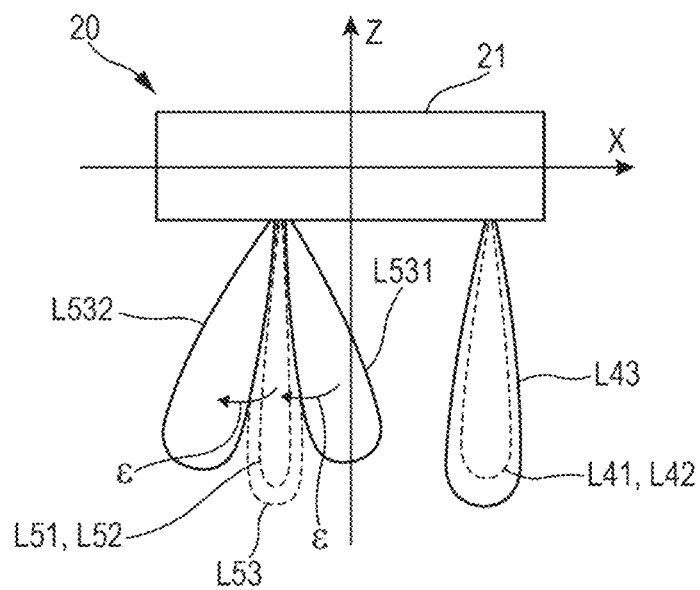
FIG. 12 is a lateral view of the ventral antenna lobes.
Figure 13:
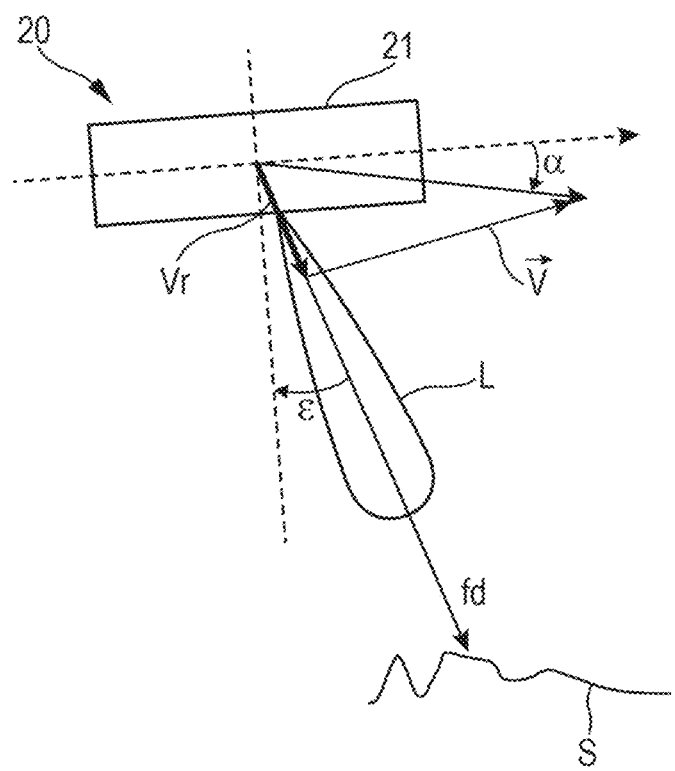
FIG. 13 is a schematic representation showing the relative velocity and the Doppler frequency on one of the antenna lobes.

The set 5 of receive antennas 51, 52, 531 and 532 is shown in FIG. 6. The set 5 is implanted on the body 21 of the carrier 20. The ventral antenna consists of two contiguous sub-arrays 531 and 532 oriented longitudinally in X and perpendicular to the axis −Z. The two sub-arrays 531 and 532 produce a forward lobe L531 and a backward lobe L532, respectively, as shown in FIG. 12, which are deviated of an angled ε (FIGS. 12 and 13) from the perpendicular to the carrier, as shown in FIG. 13. The sum of these two sub-arrays 531 and 532 provides a vertical sum lobe L53 (FIG. 12), referred to as Σ. By performing the difference of the lobes L531 and L532, difference named Δ, an "amplitude monopulse" can be realized in the signal processor 9. This processing operation allows to measure the direction of the vertical of the ground, i.e., the angle α of incidence of the carrier 21, as shown in FIG. 13. According to the "monopulse" theory, we have α=Arctg(Δ/Σ) (formula F2). Such a measurement is sometimes necessary to obtain the components of the velocity vector in the ground reference frame. Indeed, the antenna lobes measure the Doppler effects, thus the relative velocities on the axes of the antennas in the carrier reference frame. It remains to project these values in the ground reference frame, according to a traditional mathematical operation operated by the signal processor 9.

In FIG. 12, the lobes L532, L531 and L43 of the ventral antennas 532, 531 and 43 are shown as solid lines, and the lobes L51, L52, L41 and L42 of the lateral antennas 51, 52, 41 and 42 are shown as dashed lines.

On each side of the ventral antenna 531, 532, the left and right receive antennas 51 and 52 respectively are arranged. The patterns of the antennas follow the same criteria and considerations as previously discussed for the transmit antennas.

As an example, the same realization as for the emission can be performed, as shown in FIGS. 9A and 9B. In contrast to the transmit arrays, we have in reception, four connectors 59A, 59B, 59C and 59D corresponding to the four antenna arrays (instead of three), since there are two sub-arrays of ventral antennas instead of one on transmission. Specifically, the array of the set 5 of receive antennas can be realized as a single printed circuit 56 brazed to a preformed metal plate 57, as shown in FIGS. 9A and 9B. This metal plate 57 is screwed to the body 21 of the carrier 20 (using screws 58), with the four connectors 59A, 59B, 59C and 49D (relating to the four arrays) passing through the body 21 of the carrier 20.

For a good sensitivity, the transmit and receive antenna arrays must be far enough apart to be sufficiently decoupled. In addition, low noise amplifiers (LNA), or even bandpass filters if required by the radio environment, are associated as close as possible to the output connectors of the antennas.

Each antenna output (filtered, amplified) is, as shown in FIG. 2, directed towards one of the receivers 71-2, 731, 732 of the set 7 shown in FIG. 2. The outputs of the lateral antennas 51 and 52 are switched by the switch 6 towards the receiver 71-2 according to the imaging (right or left) to be performed. The outputs of the ventral antennas 531 and 532 are connected to the receivers 731 and 732. The function of the receivers is to convert the microwave signal into an amplified and filtered intermediate frequency (IF) so that it can be digitized and processed in the signal processor 9. These reception channels, in these frequency ranges, are well known. They consist of a low noise amplifier (LNA), a mixer (preferably I/Q, in phase and in quadrature), the local oscillator of this mixer coming from the synthesizer (or waveform generator 1). The mixer is followed by a low-pass filter and one or more amplifiers. These various components are commercially available.

As represented on FIG. 1, the outputs of the set 7 of receivers are digitized by the analog/digital encoders 8 ADC whose sampling frequency is more than 2.5 times the intermediate frequency (Shannon's Theorem) and whose dynamics include that of the reflectivity of the ground (approximately 30 dB) and that of the radar budget according to the range (approximately 30 dB). The sampling cadence is set by the clock generator 11. As an example, an "AD9653 Quad ADC, 16 bits, 125 Msps" can be suitable for many configurations, as it has a high dynamic range. It also has the advantage, for compact systems, to code 4 ways in parallel in a single component. Other ADC encoders with equivalent or better performance can be used.

The digitized signals are then injected into the signal processor 9.

Two types of processing operations (sequence of algorithms) are applied and programmed in the signal processor 9, depending on the waveform used.

During the FMCW transmission period (FIG. 3), the signal processor 9 performs known a SAR processing in the usual way. The signal processor 9 extracts an image of the ground, made up of pixels with intensities depending on the reflectivity of the ground, and with a resolution of the order of one or several meters. The size of the image is about 2 km×2 km. It depends on the duration of the transmission period, the altitude of the carrier and the site aperture of the lateral antenna. This image allows the system 10 to locate the readjustment landmarks.

During the CW transmission period, the signal processor 9 performs a spectral analysis on each of the receive antennas. The average Doppler effects, on each antenna lobe L (FIG. 13), each satisfy the formula F3: $fd=-2Vr/\lambda$, where $\lambda$ is the wavelength and Vr is the projection of the velocity vector onto the antenna axis. The projections Vr correspond to the relative velocities of the carrier 20 with respect to the ground 5, in each direction of the axis of these antennas.

The module V of the velocity (FIG. 13) is given by the formula F4: $V=fd*\lambda/2 \sin(\alpha+\varepsilon)$ where fd is the measured Doppler frequency, $\lambda$ is the wavelength, $\alpha$ is the incidence (angle between the axis of the carrier 21 and the velocity vector), and $\varepsilon$ is the offset of the axis of the antenna under consideration with the carrier 21.

According to the formula F4 and the spectral analysis providing fd (Doppler frequency), we obtain the velocity modulus and the incidence of the carrier with its trajectory.

The formula F3 provides as many relative velocities as there are antennas, allowing the velocity vector to be reconstructed by its components on the axes of the antennas. The spectral analysis can be realized by an algorithm of Fast Fourier Transform (FFT), which is a function generally programmed on the FPGA. The accuracy obtained on each component is proportional to the width of the spectrum obtained by the FFT transformation. The narrower the antenna lobe, the less spread out the spectrum and the more accurate the velocity measurement. FIG. 13 shows the deviation of a lobe according to the incidence of the carrier and its associated Doppler frequency.

The following are parameters that allow to optimize the accuracy performance of the system 10. According to estimation theory, the optimal standard deviation $\sigma fd$ of the Doppler measurement follows the formula F5: $\sigma fd=k\theta/\sqrt{2}S/B$ where S/B is the signal-to-noise ratio, $\theta$ is the antenna lobe width, and $k=2Vr/\lambda$. The accuracy of the V measurement therefore depends on the space available longitudinally on the carrier that allows for refinement of $\theta$, the choice of the frequency, the radar budget, and the estimator of the centre of the Doppler spectrum. These parameters are chosen according to the carrier and its mission as well as the constraints imposed by the carrier (dimensions, power, consumption, price).

The implementation of the algorithms is preferably performed on programmable logic circuits of the FPGA type (for "Field-Programmable Gate Array"). A wide range of FPGA circuits exists on the market. The choice of the type of FPGA circuit by the specialist of the signal is made according to its familiarity with the implemented functions and the programming tools of the FPGA circuit producer.

As shown in FIG. 1, the system 10 is configured and supervised by the microcontroller 12, preferably from the market. The configuration consists of setting the optimal parameters for the mission of the carrier. Thus, the microcontroller 12 sets the sequence of waveforms in FIG. 3, the durations of the FMCW and CW modes, the CW frequencies, and the frequency deviations $\Delta f$ of the FMCW mode. For these purposes, the commands are sent to the clock generator 11 which provides the sequencing of the FMCW and CW modes, and in parallel to the voltage generator 14 (FIG. 2) which provides, respectively, to the component 13 VCO-PLL a sawtooth voltage or a direct voltage. The clock generator 11 (preferably from the market) also provides the control times of the switch synchronously with the sequence of the waveform modes. The clock generator 11 also controls the sampling rate of the converter 8 and the signal processor 9.

The microcontroller 12 also provides the supervision of the system 10, in particular before the mission and after the configuration. The supervision consists of verifying that the system 10 is operating according to its programming. To this end, the microcontroller 12 performs a start-up of transmission sequences and controls the operation of the various sub-sets (levels and cadences). For example, a coupling is applied between the transmit and receive antennas, and the responses of the signal processor 9 are tested. Other test procedures can be applied. Finally, the microcontroller 12 checks the communication of the signal processor 9 with the navigation system of the carrier.

Said system 10, which exploits the backscatter of the ground to extract an imaging of the ground and the velocity vector for the purpose of performing a readjustment of all-weather and all-terrain navigation, may represent an autonomous radio navigation system.

The system 10, as described above, thus has many advantages.

Firstly, in the absence of the possibility of navigation by the satellite navigation systems (GNSS type), the system 10 allows a positioning of the carrier with respect to the ground overflown with an accuracy of a few meters.

Compared to an efficient inertial unit, the system 10 is more precise, much lighter and much less expensive. Indeed, an inertial unit equipping a transoceanic airliner is typically affected by a drift in its position estimation of the order of NM/h (nautical mile per hour). The cost of such an inertial unit can be in the hundreds of thousands of euros, a system 10 is of a lower order of magnitude.

In addition, the system 10 has other advantages, and in particular the following:
- accuracy: the combination of SAR imaging and velocity vector allows for ground positioning accuracy of the order of a few meters;
- availability: the system 10 allows an all-weather navigation and operates regardless of the terrain or the sea and its condition;
- flexibility according to the missions: the time-frequency sequence is adaptable according to the route (programmed in advance) of the carrier. Over the sea or desert for example, we will be in CW mode, while over ground containing information we will switch to the more accurate FMCW mode;
- compactness: the simplicity of the electronics allows an integration in a few litres and the patch antennas are only a few millimetres thick on the body of the carrier, which does not affect its aerodynamics;
- power consumption: the good radar budgets obtained with continuous emissions, antenna gain and integration times require only a few watts of emission. The use of the latest Microwave Monolithic Integrated Circuits MMIC made of gallium nitride (GaN) provides an efficiency of 20 to 30%;
- anti-jamming: the protection against jamming is primarily provided by the spectral spread visible in FIG. 3 and jointly by the directivity of the antennas. Indeed, an advantage of patch arrays is that the secondary lobes are controlled in phase by the distance between patches and the amplitude by the size of the patches;
- existing technology on the market: all the components mentioned in the detailed description exist in the frequencies where the system 10 can be applied;
- reliability: it is well known that the Mean Time Between Failure (MTBF) of the circuits MMIC is very high; and
- diversity of the applications.

The invention claimed is:

1. An autonomous radio navigation system, said autonomous radio navigation system being embarked on an airborne vehicle, characterised in that it comprises at least the following elements:
   - a waveform generator generating, alternately, an FMCW wave representing a linearly frequency-modulated continuous wave for a radar imaging and a CW wave representing a wave kept at a given frequency for measuring a velocity vector;
   - an amplification chain switched towards a set of transmit antennas;
   - the set of transmit antennas comprising at least one lateral antenna and one ventral antenna;
   - a set of receive antennas comprising at least one lateral antenna and one ventral antenna;
   - a set of receivers linked to the set of receive antennas; and
   - a signal processor implementing processing operations on FMCW signals received from the one or more lateral antennas of the set of receive antennas and spectrally analysing CW signals received from the one or more lateral antennas and from the one or more ventral antennas of the set of receive antennas so as to supply SAR images of the ground and components of the velocity vector of said airborne vehicle so as to enable navigation of the airborne vehicle based on the SAR images of the ground and the components of the velocity vector of said airborne vehicle.

2. The system according to claim 1, characterised in that the set of transmit antennas comprises two lateral antennas oriented at an angle with respect to the vertical to the airborne vehicle and in that the set of receive antennas comprises two lateral antennas oriented at said angle with respect to the vertical to the airborne vehicle.

3. The system according to claim 1, characterised in that the set of receive antennas comprises a double ventral antenna, arranged vertically with respect to the airborne vehicle.

4. The system of claim 1, characterised in that the set of transmit antennas and the set of receive antennas are patch antenna arrays that follow the shape of the airborne vehicle.

5. The system according to claim 4, characterised in that the arrays of transmit and receive antennas are decoupled and are associated by switching with the FMCW waveforms for realizing the SAR imaging and with the CW waveform for measuring the Doppler effect along the axes of the antennas.

6. The system according to claim 4, characterised in that the patch arrays have a secondary lobe level pattern that is sufficiently low so as to resist jamming in threat directions.

7. The system according to claim 1, characterised in that the array of receive ventral antenna is split into two subarrays forming two lobes so as to construct ways $\Sigma$ and $\Delta$ whose processing operation provides the incidence ($\alpha$) of the airborne vehicle.

8. The system according to claim 1, characterised in that it is configured to operate in sequence according to the nature of the ground.

9. The system according to claim 1, characterised in that it is configured to operate in at least one portion of the SHF microwave range.

10. The system according to claim 9, characterised in that it is configured to operate in the bands C, X and Ku.

11. The system according to claim 9, characterised in that the microwave transmit and receive modules are made of monolithic components or monolithic microwave integrated circuits MMIC made of gallium arsenide or gallium nitride.

12. The system according to claim 1, characterised in that the processing operation algorithms of the signal processor (9) are implemented on a programmable logic circuit of the FPGA type.

13. The system according to claim 1, characterised in that it comprises a clock generator configured to synchronize at least the waveforms, the digitization and the processing operation of the signals of the signal processor.

14. The system according to any claim 1, characterised in that it comprises a microcontroller configured to realize at least some of the following functions: at least one configuration, at least one control and at least one supervision of elements of said system.

15. The system according to claim 1, characterised in that it is configured to realize, from remarkable points of the SAR images associated with a position prediction obtained from the velocity vector, a readjustment of the airborne vehicle with respect to the ground.

* * * * *